(12) United States Patent
Lietonen

(10) Patent No.: US 11,364,752 B2
(45) Date of Patent: Jun. 21, 2022

(54) TOWING HOOK

(71) Applicant: SANDVIK MINING AND CONSTRUCTION OY, Tampere (FI)

(72) Inventor: Jani Lietonen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 123 days.

(21) Appl. No.: 16/622,501

(22) PCT Filed: Jun. 14, 2018

(86) PCT No.: PCT/EP2018/065783
§ 371 (c)(1),
(2) Date: Dec. 13, 2019

(87) PCT Pub. No.: WO2018/229180
PCT Pub. Date: Dec. 20, 2018

(65) Prior Publication Data
US 2021/0146737 A1      May 20, 2021

(30) Foreign Application Priority Data

Jun. 15, 2017   (EP) .................................... 17176182

(51) Int. Cl.
*B60D 1/04*        (2006.01)
*B60D 1/48*        (2006.01)
(Continued)

(52) U.S. Cl.
CPC ............... *B60D 1/04* (2013.01); *B60D 1/488* (2013.01); *B60D 1/50* (2013.01);
(Continued)

(58) Field of Classification Search
CPC . B60D 1/04; B60D 1/488; B60D 1/50; B60D 1/145; B60D 1/155; B60D 1/187;
(Continued)

(56) References Cited

U.S. PATENT DOCUMENTS 497,837 A      5/1893   Hamling
3,868,098 A *  2/1975   Coombs ................... B60D 1/50
                                                      267/138
(Continued)

FOREIGN PATENT DOCUMENTS

CN       101475011 A     7/2009
CN       103434351 A2   12/2013
(Continued)

*Primary Examiner* — Jacob D Knutson
*Assistant Examiner* — Abigail R Hymel
(74) *Attorney, Agent, or Firm* — Corinne R. Gorski

(57) ABSTRACT

A towing hook arranged on a mining machine, with a first end having a bent portion to allow a towing tool to be connected and a second end having a cylindrical rod. An intermediate part is located between the first and the second end. The towing hook is arranged to be mounted in a through hole in a frame of a machine in order for the first and second ends to be positioned on different sides of the machine frame. The intermediate part is mounted partly in the through hole of the frame, and wherein the longitudinal axis of the cylindrical rod is generally parallel with a longitudinal axis defined through the towing hook representing the force transmitting direction when connecting the towing tool to the bent portion.

15 Claims, 7 Drawing Sheets

(51) Int. Cl.
*B60D 1/50* (2006.01)
*B60D 1/54* (2006.01)
*B61G 1/36* (2006.01)

(52) U.S. Cl.
CPC ..... *B60D 2001/544* (2013.01); *B60Y 2300/28* (2013.01); *B61G 1/36* (2013.01)

(58) Field of Classification Search
CPC ............. B60D 1/249; B60D 2001/544; B60Y 2300/28; B61G 1/36
See application file for complete search history.

(56) References Cited

U.S. PATENT DOCUMENTS

| | | | |
|---|---|---|---|
| 4,314,730 A | | 2/1982 | Plumton et al. |
| 5,238,298 A | * | 8/1993 | Wagner .................. B60T 13/22 188/170 |
| 2013/0140793 A1 | * | 6/2013 | Terpsma .................. B60D 1/14 280/504 |
| 2014/0062178 A1 | | 3/2014 | Panse et al. |
| 2015/0048596 A1 | * | 2/2015 | Najarro .................. B60D 1/04 280/514 |

FOREIGN PATENT DOCUMENTS

| | | |
|---|---|---|
| DE | 2909730 A1 | 9/1979 |
| FR | 2779288 A1 | 12/1999 |
| FR | 2779388 B1 | 9/2001 |

\* cited by examiner

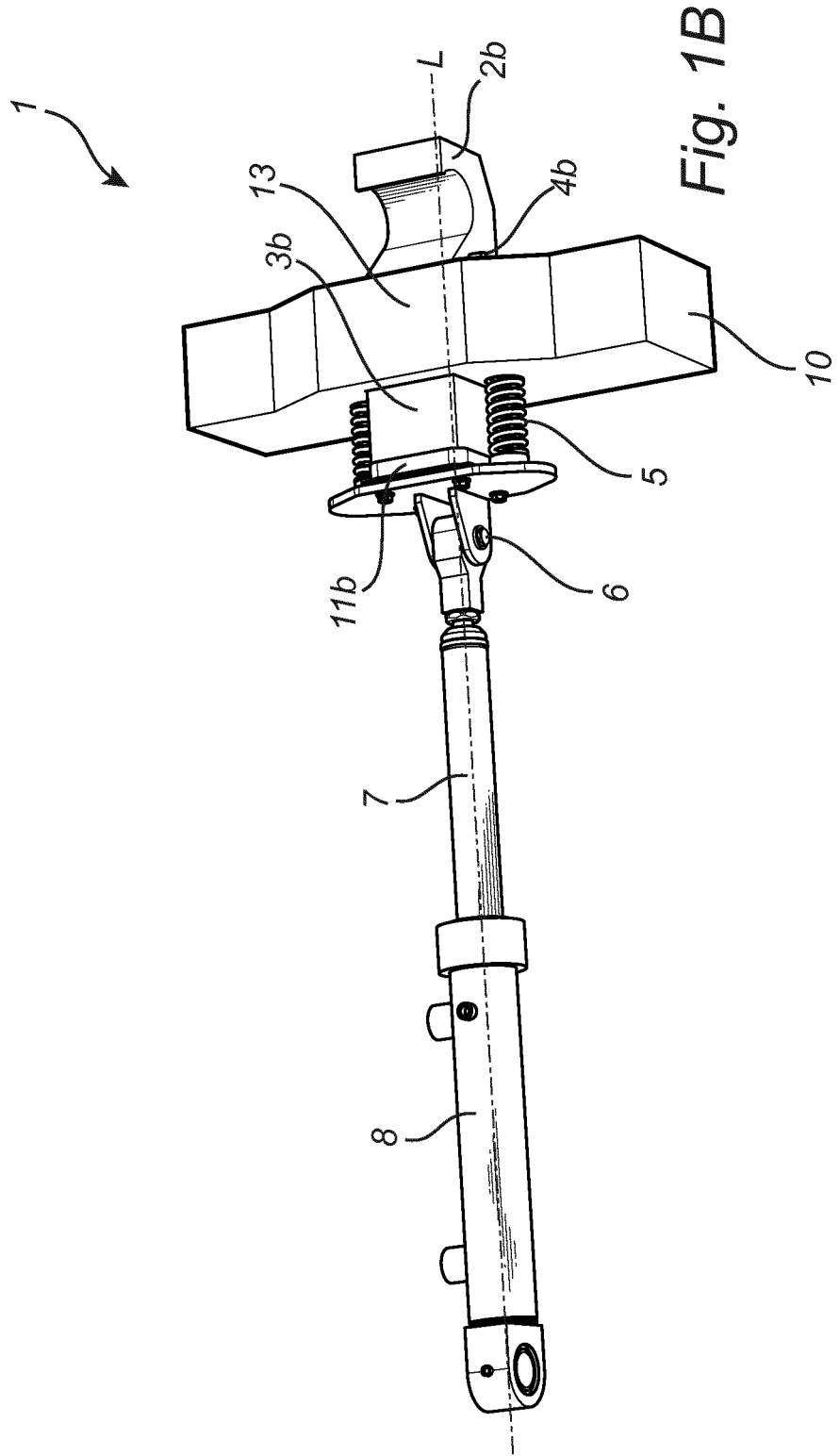

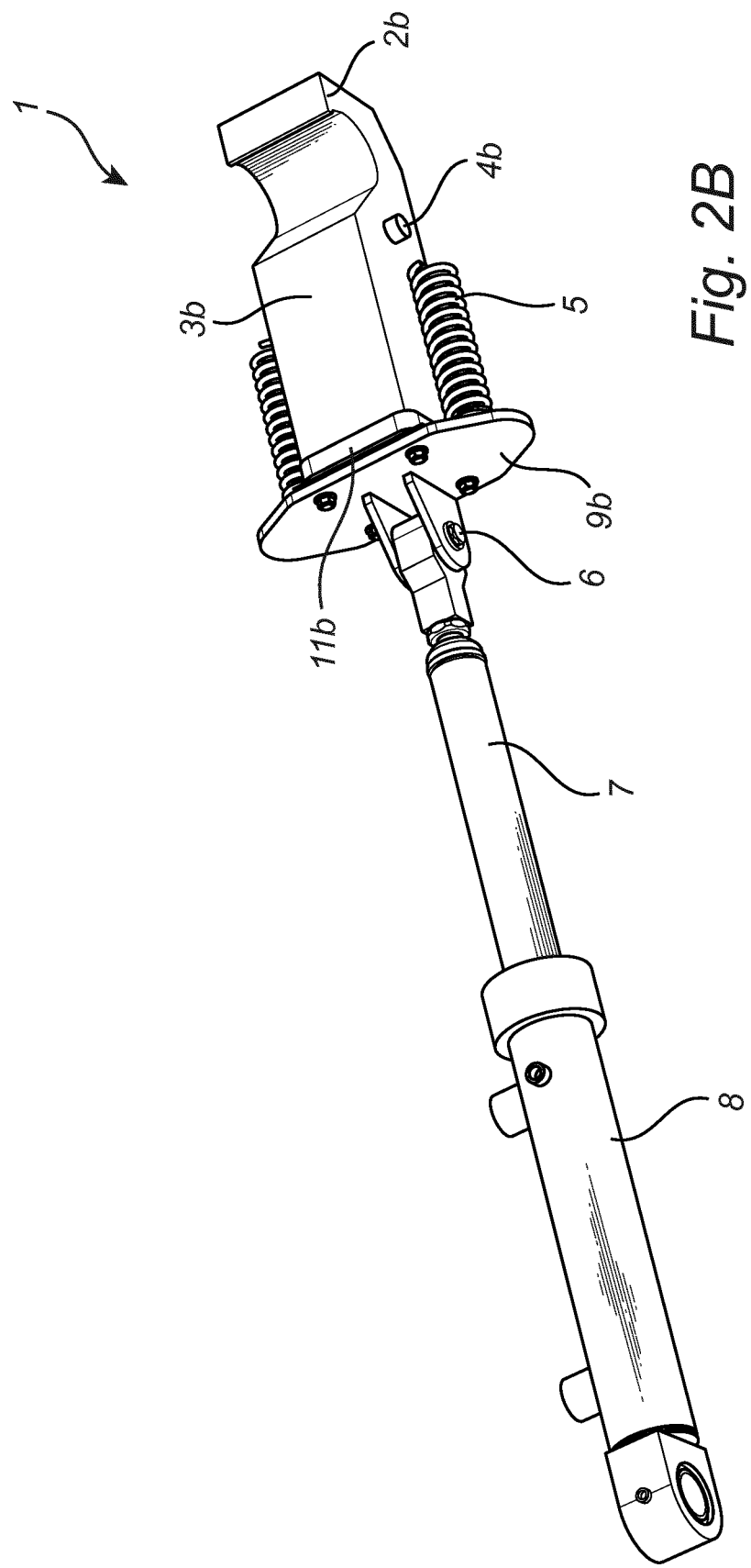

TOWING HOOK

RELATED APPLICATION DATA

This application is a § 371 National Stage Application of PCT International Application No. PCT/EP2018/065783 filed Jun. 14, 2018 claiming priority to EP 17176182.8 filed Jun. 15, 2017.

FIELD OF INVENTION

The present invention relates to a towing hook system for a machine working underground. When there is an emergency situation there is a need to be able to pull out the machine. There is a specific need of facilitating the towing of a heavy mining machine.

BACKGROUND ART

Towing hooks also known as retrieval hooks are commonly used on heavy machines, such as mining machines. These types of vehicles normally weigh 10 to 50 t. When the vehicle is in use it is controlled and driven either from an operator cabin located on the machine or in a separate cabin or platform or the similar in a place remote from the vehicle, i.e. remote controlled. When the machine comes to a standstill the brakes are normally activated by default.

If there is an emergency situation underground such that the vehicle partly is hindered to continue working, e.g. from a stope having collapsed, there is a need to pull out the vehicle, to have it towed away from the collapsed part or otherwise dangerous area. In this situation when the machine is not able to be operated or is buried under rocks the operator is hindered to further operate the machine, the operator may even be hindered to be near the machine due to the hazardous environment and there is a need to tow the machine. Towing hooks are robust and aim to facilitate the towing of these types of heavy vehicles normally equipped with a hydraulic brake system. The towing is performed with another vehicle or pulling equipment (e.g. a winch) being mounted to the hook.

U.S. Pat. No. 5,238,298 describes a method and apparatus that releases a spring-activated hydraulically-released vehicle brake to permit the towing of a disabled vehicle. This system uses a pivoting hook that is acted on by tractive force from the coupled towing device to generate a hydraulic fluid pressure in a brake-release circuit. The tow hook is part of a rigid generally L-shaped bell crank lever. However, existing tow hooks are often complicated constructions and there exists a need for a tow hook not needing any extra structures in the machine frame.

This type of mining machine normally has a loader at the forward end and the towing hook is arranged at the rearward end. When the machine is towed any kind of towing tool is used, either a corresponding hook of a towing car or a rope or the similar. The machine is then moving in the reversed direction. There is a need for a smaller hook that saves space and has as few parts as possible located outside of the vehicle. Further there is also a need to have a simpler construction for which maintenance is minimized.

SUMMARY OF THE INVENTION

It is an objective of the present invention to provide a towing hook for a heavy machine that is secure and robust in tough conditions underground. It is a further objective to have a hook with a simple configuration avoiding frequent maintenance, and which have only a limited number of components mounted to the outside of the machine. The part of the hook being arranged on the outside of the machine serves as the specific point where retrieving equipment is connected and operated, such as another vehicle, a rope, a winch or the like.

The objectives are achieved by providing a towing hook with a first end bent portion and the connecting parts following in line in order to direct the force. Accordingly, the hook has a mainly straight construction. Such a configuration has been found to be simple, yet being rigid enough and able to meet all safety regulations. This hook is able to transmit a big towing force that can be as large as three times the weight of the machine.

According to one aspect of the present invention there is provided a towing hook arranged on a mining machine, comprising: a first end having a bent portion to allow a towing tool to be connected, a second end having a cylindrical rod, an intermediate part being located between the first and the second end, the towing hook to be mounted in a through hole in a frame of a machine in order for the first and second ends to be positioned on different sides of the machine frame, and the intermediate part mounted partly in the through hole of the frame, and wherein the longitudinal axis of the cylindrical rod is generally parallel with a longitudinal axis defined through the towing hook representing the force transmitting direction when connecting the towing tool to the bent portion.

Accordingly, the slim design makes the hook space efficient, both in its entire extent and that only the bent portion is mainly the only part extending outside of the vehicle. Also, a direct force along the longitudinal axis is achieved, which gives a focused force directing and transmitting the towing force in an efficient way.

Preferably, the cylindrical rod of the hook is connected to a tube having the same longitudinal axis as the cylindrical rod. The cylindrical tube has preferably a larger diameter than the cylindrical rod, thus the rod may with one end be mounted in one end of the cylindrical tube. This helps to direct the force efficiently. The longitudinal axis of the hook may also coincide with the longitudinal axis of the cylindrical tube.

Preferably, the intermediate part of the hook is mounted freely in the through hole of the machine frame to allow the hook to be moved in relation to the frame. A small spacing is desirable, the spacing serves to guide the intermediate part and thus, the hook.

Preferably, the hook comprises a first stopper element and a second stopper element. The stopper elements hinder the hook to be pulled out of the machine frame either in the forward or backward direction of the machine along the longitudinal axis.

Preferably, the first stopper element is mounted at the first end of the hook. This stopper element hinders the hook to be pulled through the machine frame in the forward direction of the machine when no towing force is applied.

Preferably, the first stopper element is a pin with an axis perpendicular to the surface of the first end of the hook and the axis being parallel to the surface of the machine frame. The pin is preferably arranged on the side of the hook, close to the bent portion. The pin or plug can be a small element since a small extension from the surface is efficiently hindering the hook to be pulled through. The first stopper element can be one pin or several pins arranged around the periphery of the first end of the hook.

Preferably, the first stopper element is a shoulder located at the first end of the hook toward the intermediate part. A shoulder can be an integrated part between the bent portion and the intermediate part, thus easy to manufacture. The shoulder or edge is arranged along at least one side of the first end of the hook. This shoulder has an extension parallel with the surface of the machine frame and thus, functioning as an abutment surface against the machine frame.

Preferably, the second stopper element is mounted at the intermediate part of the hook.

This is efficient to hinder the hook being pulled out in the backward direction of the machine when the towing force is applied to the machine.

Preferably, the second stopper element is a shoulder located at the intermediate part toward the second end. A shoulder can be an integrated part, which is easy to manufacture, at the intermediate part farthest from the bent portion. The shoulder or edge is arranged along at least one side of the intermediate part of the hook. This shoulder has an extension parallel with the surface of the machine frame.

Preferably, the second stopper element is a pin having a longitudinal axis perpendicular to the longitudinal axis of the cylindrical rod, and wherein the intermediate part comprises a through hole, which pin is arranged in the through hole. This design saves space and enables the hook to be assembled from the rear side of the machine.

Preferably, the second stopper element is mounted in the machine frame. This gives a compact design, which also is a safe configuration.

Preferably, at least two springs are mounted in connection to the intermediate part, wherein the spring extends between the end surface of the intermediate part being connected to the second end of the hook and the machine frame. The two springs are located on opposite sides of the intermediate part, one on each side. Alternatively, more than two springs may be used. Preferably, an even number of springs in total, such as 6, 8, 10 or 12, in order to have a symmetrical arrangement of the springs, so that the number of springs of each side is the same. The springs efficiently return the hook to the neutral position after the towing force has been released.

Preferably, the intermediate part is pivotally engaged at a pivoting point with the second end. This is a flexible point to alleviate any tensions. This point gives also the cylindrical rod and tube the possibility to slightly deviate from the longitudinal axis. The deviation is not more than 5° to 10° between an axis along the cylindrical rod and the longitudinal axis of the towing hook.

Preferably, the tube is connected to the brake system of the machine. The tube may be a cylindrical tube connected to the cylindrical rod at one end and to the brake system at the opposite end, e.g. be in the frame of the machine. The tube may be a hydraulic cylinder creating an oil pressure when the hook is used for towing of the machine. The hydraulic cylinder is directly pulled by the rod, which works as a piston rod of the hydraulic cylinder. The hydraulic cylinder is connected to the hydraulic brake system. The connection to the wheel brake system further facilitates the towing operation as it decreases the needed force applied when towing.

According to a second aspect of the present invention there is provided a towing hook system transmitting the towing force applied at the bent portion of the first end of the hook to the tube connected to the second end, wherein the tube removes the brake force of the machine.

BRIEF DESCRIPTION OF DRAWINGS

A specific implementation of the present invention will now be described, by way of example only, and with reference to the accompanying drawings in which:

FIG. 1B is a perspective view of a second embodiment of a towing hook in connection of a machine frame;

FIG. 2B is a perspective view of a second embodiment of a towing hook;

DETAILED DESCRIPTION OF PREFERRED EMBODIMENTS OF THE INVENTION

The subject invention will be described by way of example with reference to a towing hook facilitating the towing of a mining machine. It will be appreciated that the subject invention is applicable to any type of heavy vehicle for which the brakes are activated when the vehicle is standing still.

Figure 1A:
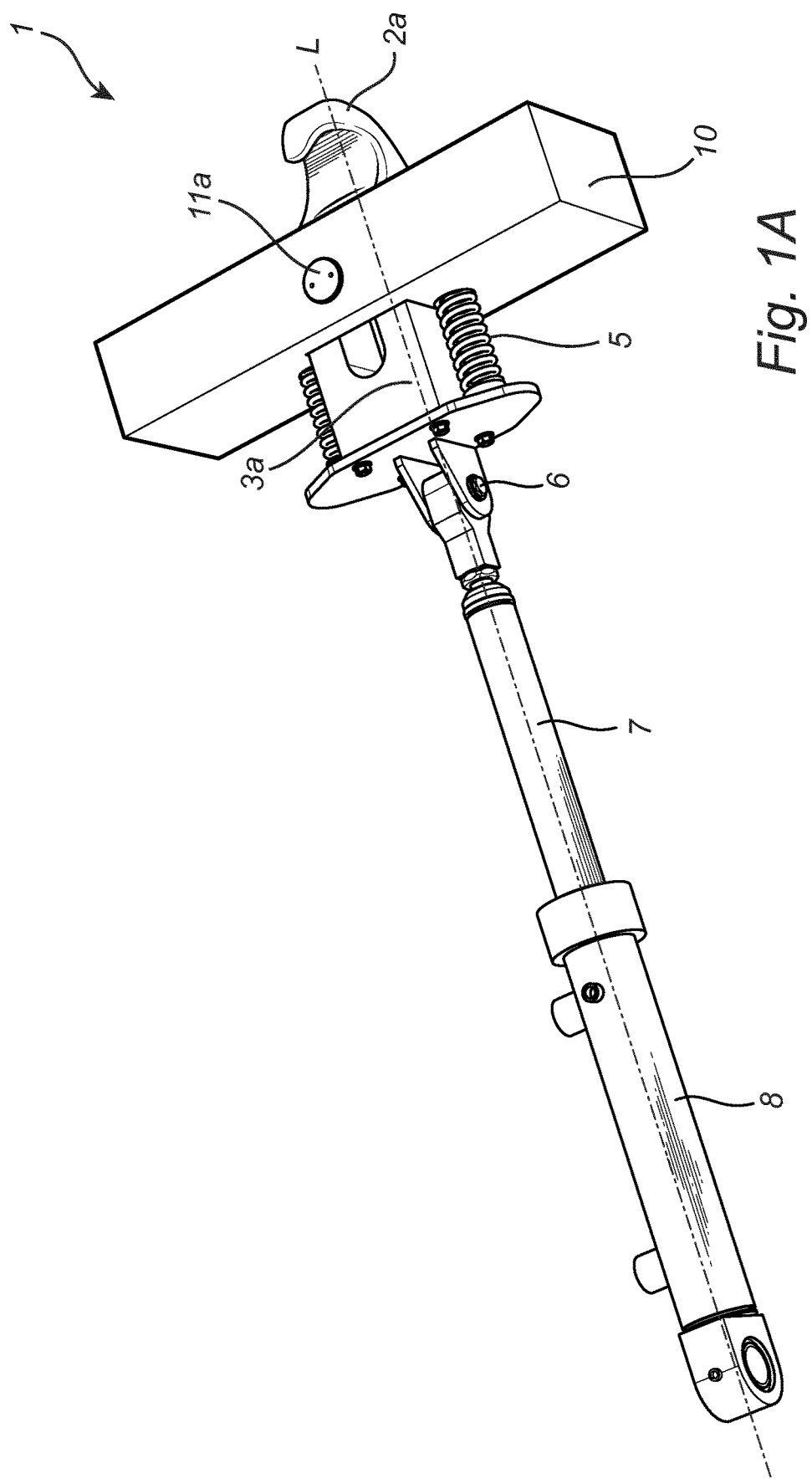
FIG. 1A is a perspective view of a first embodiment of a towing hook in connection of a machine frame.

Referring to FIG. 1A, a perspective view of a towing hook 1 is disclosed. The hook has an elongate configuration with a main longitudinal axis L. The hook comprises a bent portion 2a at one end and a cylindrical tube 8 at the other opposite end. Connecting to the bent portion of the hook is an intermediate part 3a with a certain extension following the longitudinal axis. The intermediate part 3a is arranged with a first end connecting to the bent portion 2a and a second end in the longitudinal direction connecting to a cylindrical rod 7. The intermediate part is connected to the cylindrical rod at a flexible pivot point 6, or any kind of flexible hinge. The cylindrical rod 7 is, in the longitudinal direction, connected at a first end to the intermediate part and at the second end to the cylindrical tube 8. The connection between the rod 7 and the tube 8 is flexible in the longitudinal direction and rigid perpendicular to the longitudinal direction, the connection could be fitted as a sliding connection with the inner diameter of the tube somewhat larger than the outer diameter of the rod or a threaded connection or similar. The cylindrical rod 7 may be surrounded by a spring (not shown) that serves as a return spring. The cylindrical tube 8 has preferably a somewhat larger diameter than the cylindrical rod 7, thus the rod may with one end be mounted on the inner side of one end of the cylindrical tube. The pivot point 6 allows the cylindrical rod 7 together with the cylindrical tube 8 to some extent depart from the main longitudinal axis L. This angle is normally not more than 5°, in some situations it can be up to 10°. The longitudinal axis of the hook may thus, be generally parallel with the longitudinal axis of the cylindrical rod or both axis may coincide so that they are aligned as seen in the figures.

The cylindrical tube 8 is connected to the brake system of the machine via a first and a second port. The first port is located closest to the cylindrical rod 7 and the bent portion 2a, 2b of the hook. The second port is located at the end farthest from the cylindrical rod 7 and the bent portion 2a, 2b of the hook.

In parallel to the intermediate part 3a springs 5 are arranged. One spring on opposite sides of the intermediate part is disclosed. Any other number of springs may be arranged on each side, such that there is symmetry of springs, the same number of springs on both sides. The springs have a longitudinal extension parallel to the main longitudinal axis L of the hook, at one end mounting to the machine frame 10 and at the other end to an end surface 9a of the second end of the intermediate part 3a, as seen in e.g. FIG. 2A.

Figure 2A:
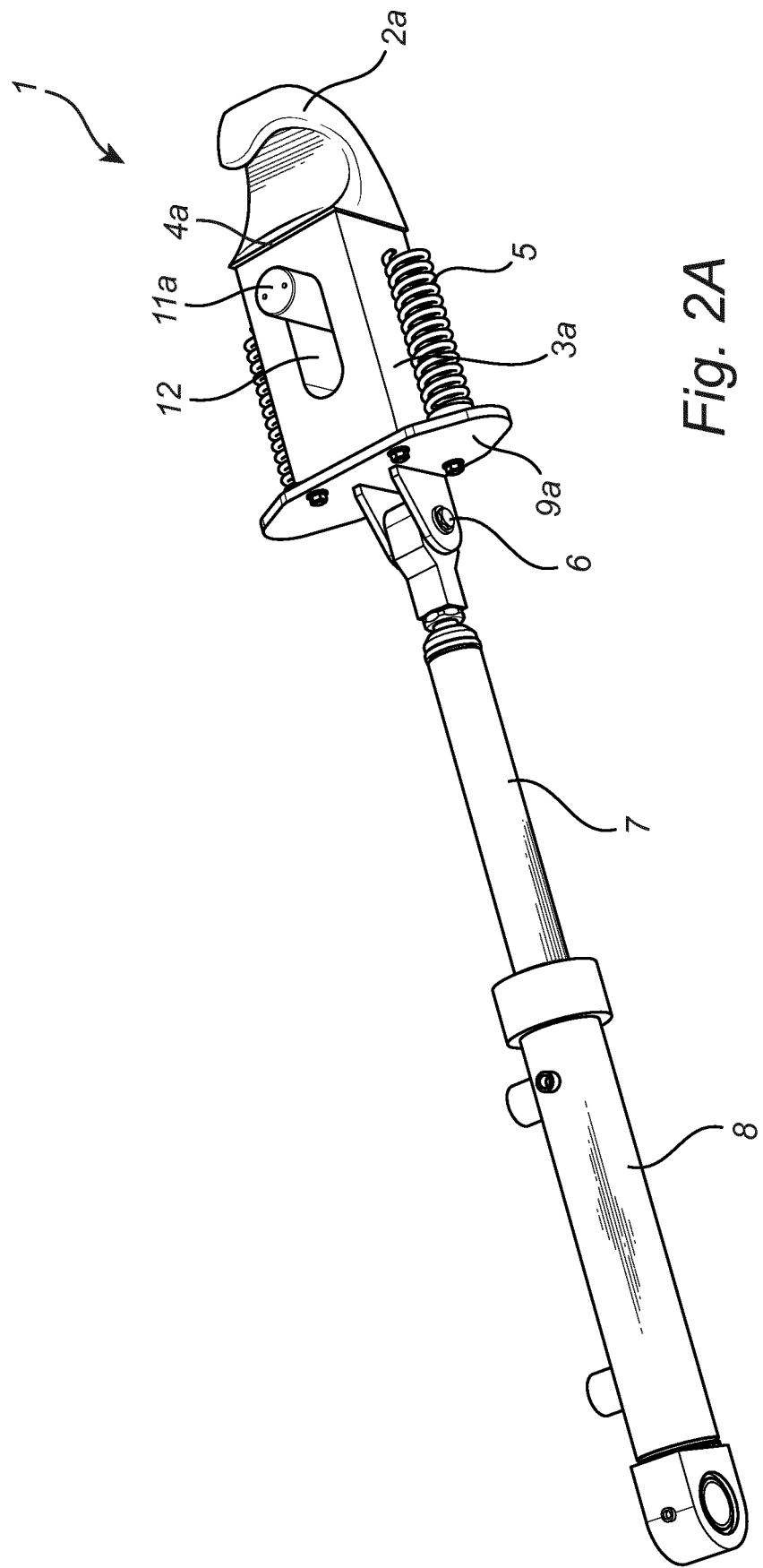
FIG. 2A is a perspective view of a first embodiment of a towing hook.

Referring to FIG. 2A, the same perspective view of the towing hook as in FIG. 1A is shown, but without any part of the machine frame visible. The entire longitudinal extension of the intermediate part 3a is shown, from the first end connected to the bent portion 2a of the hook to the second end with a plate defining an end surface 9a. The bent portion 2a connecting to the intermediate part 3a has a shoulder or edge or any other kind of first stopper element 4a. The shoulder or edge is arranged along at least one side of the connection between the bent portion and the intermediate part of the hook. This shoulder has an extension parallel with the surface of the machine frame, functioning as an abutment surface against the machine frame. The second stopper element 11a is a pin, tube or similar having a circular cross section. The second stopper element is mounted in a ridge or channel defining an oblong through hole 12 having an elongate extension parallel with the longitudinal axis of the hook 1. Both ends of the elongate through hole have the same radius, which radius is generally the same or somewhat larger than the radius of the circular cross section of the second stopper element 11a. By having a pin with a circular cross section a smooth motion is achieved when pulling the hook by applying a towing force. However, any other shape instead of a circular cross section of the pin 11a could be considered, such as oval, rectangular, etc.

When mounting the hook in the machine frame 10 the bent portion 2a together with the intermediate part 3a is preferably inserted into the through hole of the machine frame by first inserting the second end of the intermediate part and when the intermediate part is safely arranged in the through hole of the machine frame the plate being the end surface 9a can be connected and rigidly fixed to the second end of the intermediate part, preferably with bolts. The second stopper element 11a will then be arranged in the machine frame 10 and in the elongated through hole 12 accordingly. The second stopper element 11a is able to slide freely in the oblong through hole 12.

The intermediate part 3a, 3b must be able to slide in the machine frame and thus, allowing the entire hook 1 to move in the longitudinal direction when a towing force is applied and then released. The spacing between the intermediate part and the through hole is small, as the spacing serves to guide the intermediate part and thus, the hook. The intermediate part has a mainly rectangular cross section seen in the longitudinal direction.

The towing hook is mounted in the frame 10 of a heavy vehicle, of which frame only a small part is shown in FIG. 1A. The second stopper element 11a is mounted with tight fitting in the machine frame, e.g. the element should not be able to move in the frame during normal use. The towing hook is mounted in the frame of the rear end of the heavy vehicle. The ultimate end of the towing hook with the bent portion 2a, 2b can move in a substantially longitudinal direction when towing takes place. This is contrary to the other ultimate end opposite the bent portion 2a, 2b as shown in the drawings, this ultimate end is fixedly arranged in the frame of the machine.

Referring to FIG. 1B, a perspective view of another embodiment of a towing hook 1 is disclosed. Similar as in FIG. 1A the hook has a longitudinal extension with a bent portion 2b in one end followed by an intermediate part 3b, connected via a pivot point 6 to the cylindrical rod 7 followed by the cylindrical tube 8 at the second end. As in FIG. 1A springs 5 are arranged close to the intermediate part. A part of the machine frame 10 is also shown. Different to the embodiment of FIG. 1A the machine frame may comprise a broader area 13 giving enough space for a through hole for mounting the intermediate part 3b of the hook.

Identical parts already described in connection to the first embodiment will not be further described.

Referring to FIG. 2B, the same perspective view of the towing hook as in FIG. 1B is shown, but without any part of the machine frame included. The first stopper element 4b is a pin or a similar small element protruding from the side of the towing hook, close to the bent portion 2b. The second stopper element 11b is a shoulder or edge at the second end of the intermediate part 3b. The shoulder or edge is arranged along at least one side of the intermediate part of the hook, adjacent the plate being the end surface 9b. This shoulder has an extension parallel with the surface of the machine frame and thus, works as an abutment surface against the machine frame.

When mounting the hook in the machine frame 10 the bent portion 2b together with the intermediate part 3b is preferably inserted into the through hole of the machine frame by first inserting the first end of the intermediate part and when the intermediate part is safely arranged in the through hole of the machine part the first stopper element 4b is firmly arranged in the hook close to the bent portion 2b.

The bent portion 2a of the hook may have smooth edges as seen in the first embodiment seen in FIGS. 1A, 2A, 3A and 4A, respectively. The bent portion 2b may also comprise sharper edges as seen in FIGS. 1B, 2B, 3B and 4B, respectively.

Figure 3A:
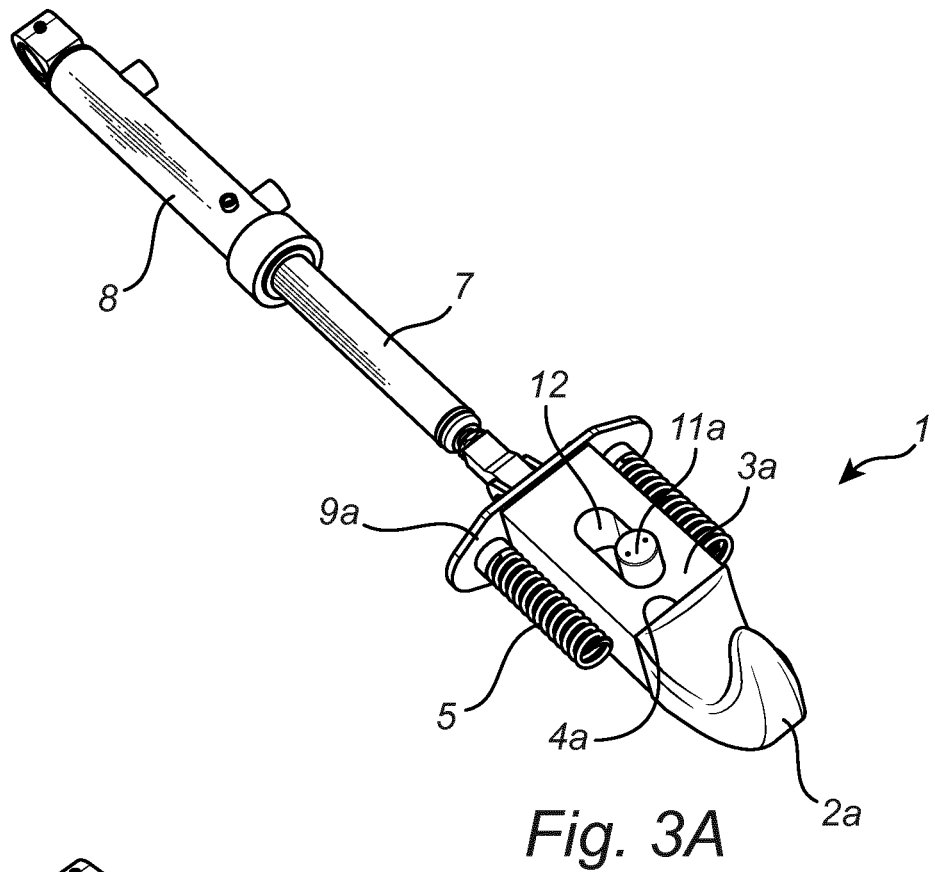
FIG. 3A is another perspective view of a first embodiment of a towing hook.
Figure 4A:
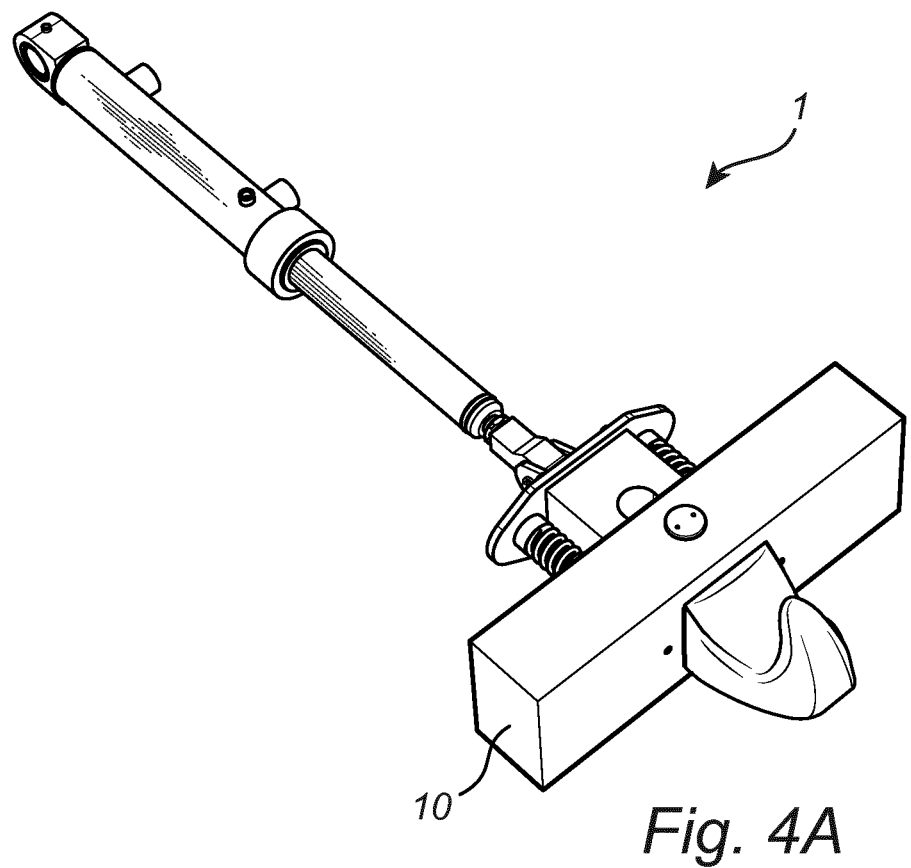
FIG. 4A is another perspective view of a first embodiment of a towing hook in connection of a machine frame.

Referring to FIGS. 3A and 4A, another perspective view of the hook according to the first embodiment is disclosed, without and with machine frame respectively.

Figure 3B:
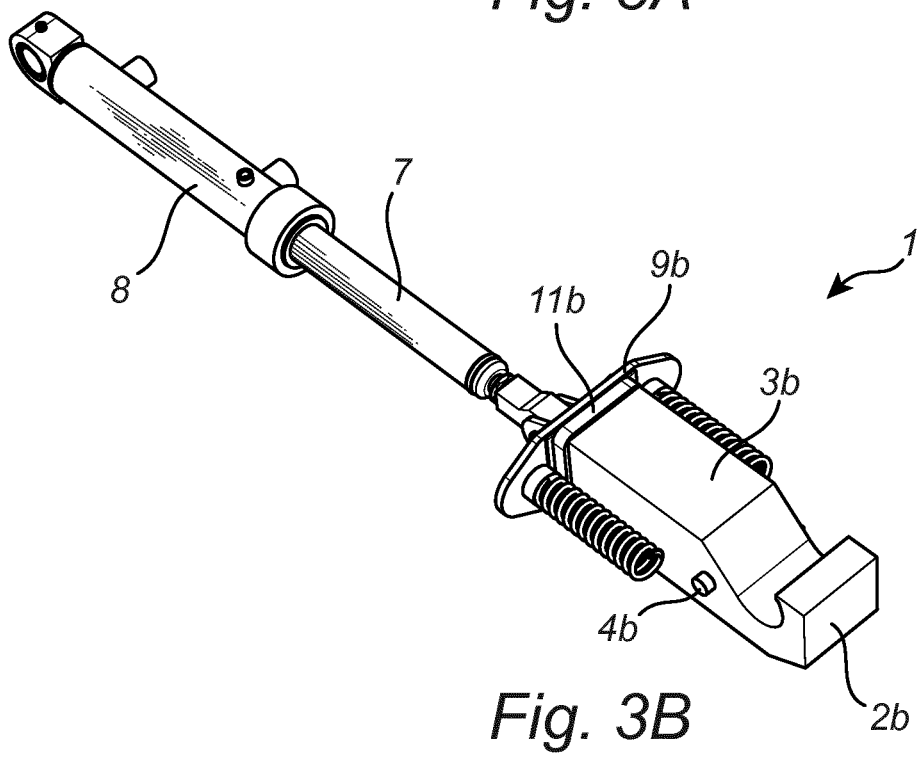
FIG. 3B is another perspective view of a second embodiment of a towing hook.
Figure 4B:
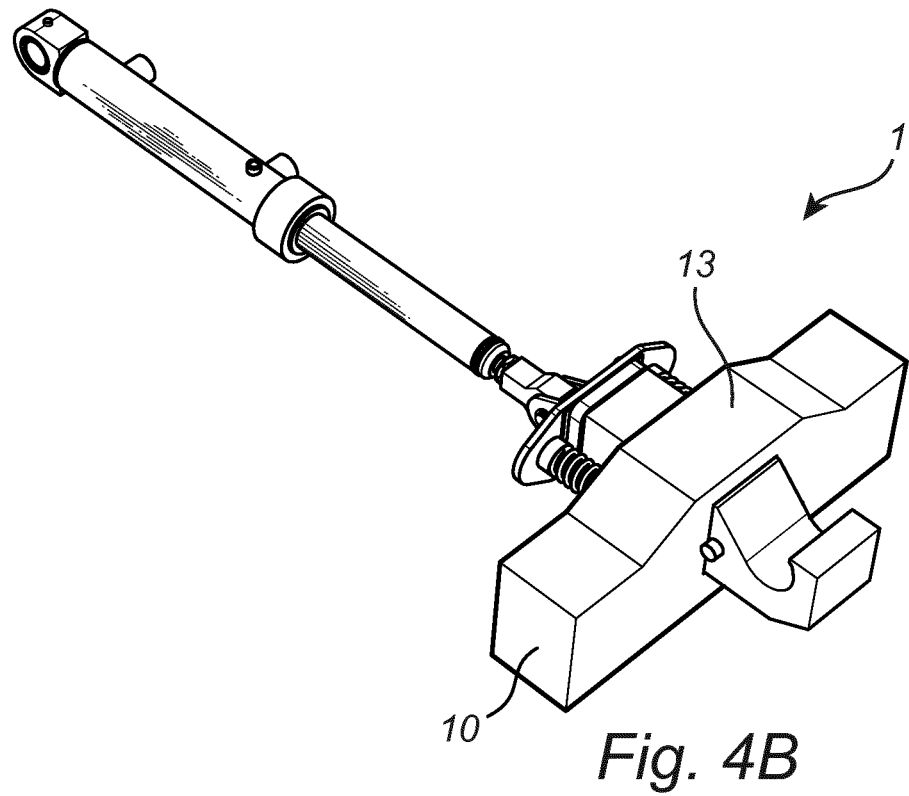
FIG. 4B is another perspective view of a second embodiment of a towing hook in connection of a machine frame.

Referring to FIGS. 3B and 4B, another perspective view of the hook according to the second embodiment is disclosed, without and with machine frame respectively.

When the machine is towed any kind of towing tool can be connected to the bent portion of the hook. The towing tool can either be a corresponding hook of a towing car, a wire loop, shackle or a rope, or the similar. When applying a pulling force at the bent portion 2a, 2b in a longitudinal direction the intermediate part 3a, 3b of the hook 1 can slide in the machine frame 10 such that the pivot point 6 is moved and the cylindrical rod 7 is moved in a longitudinal direction. The springs 5 are compressed. An oil flow is created flowing out of the first port of the cylindrical tube 8 being located closest to the cylindrical rod 7, resulting in the hydraulic circuit releasing the machine brakes. The sliding motion is limited by the first stopper element 4a, 4b and on the other end by the second stopper element 11a, 11b. When applying the towing force, the hook is pulled out in the longitudinal direction until the second stopper element 11a in the form of a pin bears against the end of the oblong through hole 12 most remote from the bent portion 2a. Alternatively, when the second stopper element 11b in the form of a shoulder comes to close contact with the machine frame 10, the hook cannot be pulled out further. When the towing takes place so that the pulling force is transmitted to the machine being moved, the second stopper element 11a, 11b carries the towing force.

When the towing action is completed and the force applied is removed the springs 5 help the hook to return to the original position as before starting the towing action, the machine frame will then again bear against the first stopping element in either the form of an edge 4a or a pin 4b. This also has the effect that the intermediate part 3a, 3b slides back to its original position and that the cylindrical rod 7 moves back to its original position in a longitudinal direction. Also, the creation of a hydraulic oil flow back into the hydraulic tube via the second port will result in the hydraulic circuit activating the machine brakes.

Figure 5:
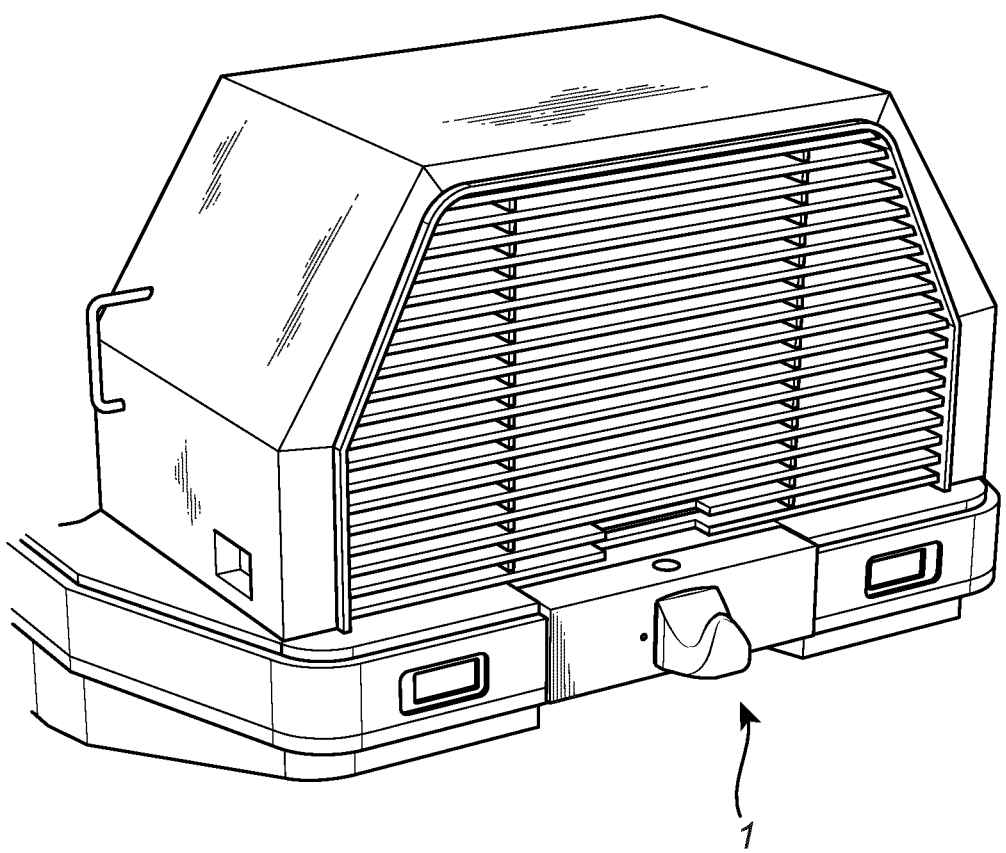
FIG. 5 is a perspective view of a towing hook mounted in the frame of a mining machine.

Referring to FIG. 5, the towing hook is shown to be mounted in the frame of a mining machine. The mining machine can be a loader. The hook is mounted at the rearward end, opposite the bucket of the loader.

The invention claimed is:

1. A towing hook arranged on a mining machine, the towing hook comprising:
   a first end having a bent portion arranged to allow a towing tool to be connected;
   a second end having a cylindrical rod with a longitudinal axis; and
   an intermediate part located between the first and the second ends, wherein the towing hook is arranged to be mounted in a through hole in a frame of a machine such that the first and second ends are positioned on different sides of the machine frame and the intermediate part is mounted partly in the through hole of the frame, and wherein the longitudinal axis of the cylindrical rod is generally parallel with a longitudinal axis defined through the towing hook representing a force transmitting direction when connecting the towing tool to the bent portion.

2. The hook according to claim 1, wherein the cylindrical rod is connected to a tube extending along the longitudinal axis of the cylindrical rod.

3. The hook according to claim 2, wherein the tube is connected to a brake system of the machine.

4. The hook according to claim 1, wherein the intermediate part of the hook is mounted freely in the through hole of the machine frame to allow the hook to be moved in relation to the frame.

5. The hook according to claim 1, wherein the hook includes a first stopper element and a second stopper element.

6. The hook according to claim 5, wherein the first stopper element is mounted at the first end of the hook.

7. The hook according to claim 5, wherein the first stopper element is a pin with an axis perpendicular to a surface of the first end of the hook and the axis being parallel to a surface of the machine frame.

8. The hook according to claim 5, wherein the first stopper element is a shoulder located at the first end of the hook toward the intermediate part.

9. The hook according to claim 5, wherein the second stopper element is mounted at the intermediate part of the hook.

10. The hook according to claim 9, wherein the second stopper element is a shoulder located at the intermediate part toward the second end.

11. The hook according to claim 9, wherein the second stopper element is a pin having a longitudinal axis perpendicular to the longitudinal axis of the cylindrical rod, and wherein the intermediate part includes a through hole in which the pin is arranged in the through hole.

12. The hook according to claim 11, wherein the second stopper element is mounted in the machine frame.

13. The hook according to claim 1, wherein at least two springs are mounted in connection to the intermediate part, wherein the springs extend between the end surface of the intermediate part connected to the second end of the hook and the machine frame.

14. The hook according to claim 1, wherein the intermediate part is pivotally engaged at a pivoting point with the second end.

15. A towing hook system comprising a hook according to claim 1, wherein the cylindrical rod is connected to a tube extending along the longitudinal axis of the cylindrical rod, and wherein the system transmits the towing force applied at the bent portion of the first end to the tube connected to the second end, and wherein the tube removes a brake force of the machine.

* * * * *